June 1, 1948. O. W. SWANSON 2,442,475
EGG WASHING MACHINE
Filed Dec. 22, 1943 2 Sheets-Sheet 2
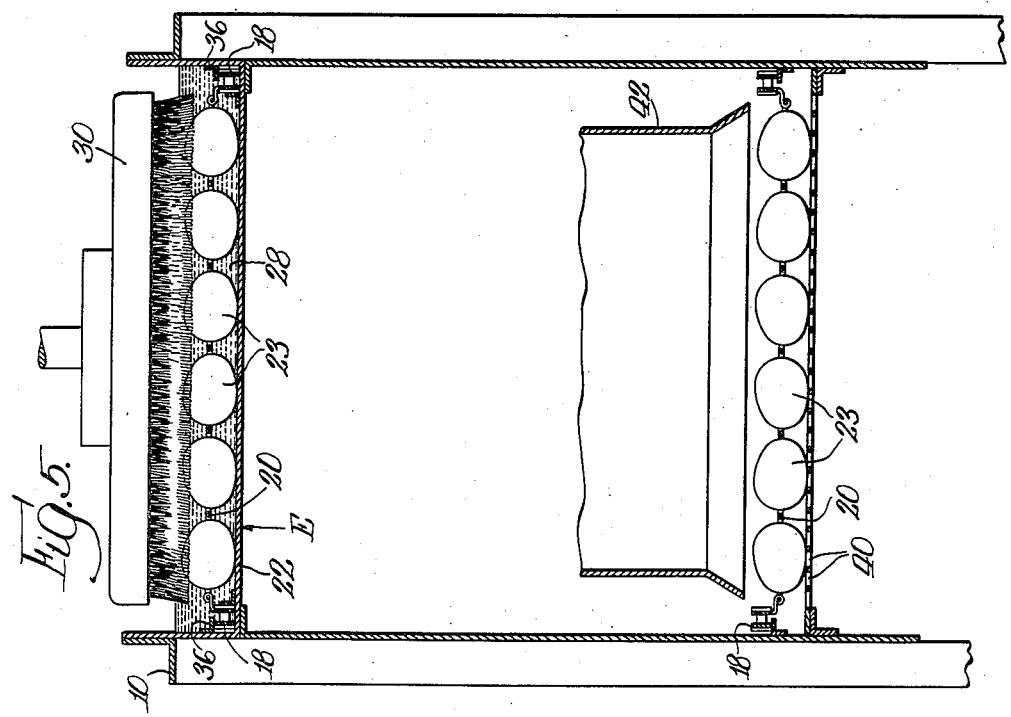
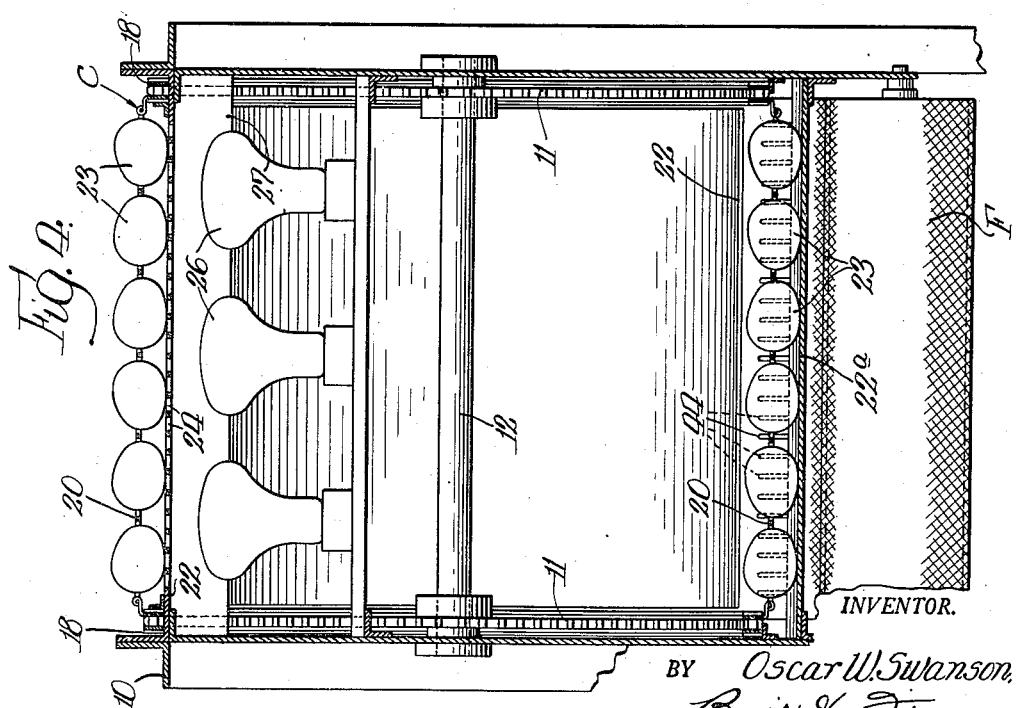
INVENTOR.
BY Oscar W. Swanson,
Bair & Freeman
Attys.

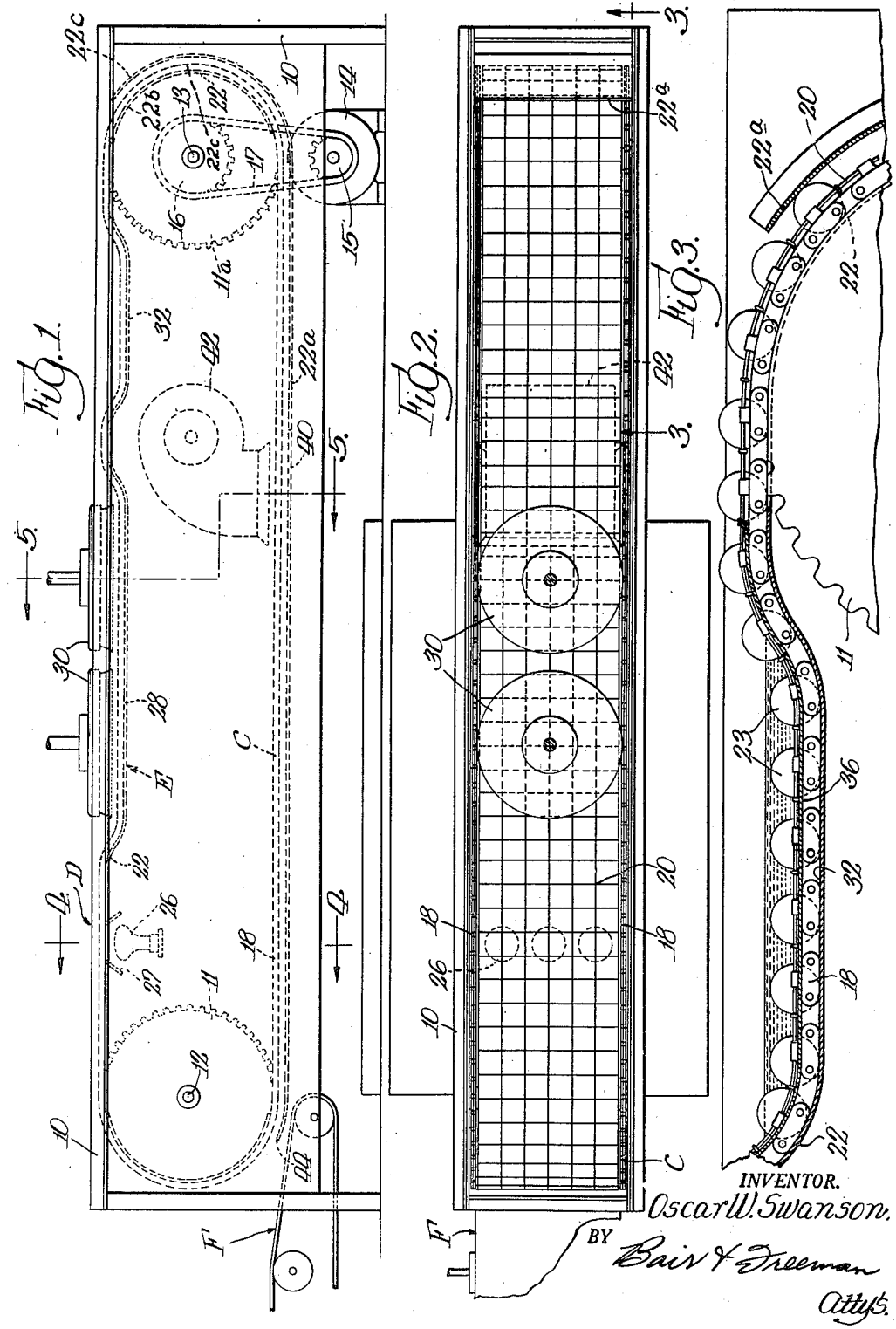

Patented June 1, 1948

2,442,475

UNITED STATES PATENT OFFICE 2,442,475

EGG WASHING MACHINE

Oscar W. Swanson, Ottumwa, Iowa

Application December 22, 1943, Serial No. 515,200

2 Claims. (Cl. 15—3.13)

My invention relates to an egg washing machine.

It is my object to provide such a machine of simple and economical structure, by which eggs can thoroughly be washed without injury.

In greater detail, it is the object of my invention to provide a machine having a conveyor in which a meshed wire conveyor member travels over a smooth platform for holding and conveying the eggs.

It is another object to provide novel means for subjecting the eggs to washing and brushing and subsequently to rinsing.

Another purpose is to provide novel means for carrying the eggs around the end of the conveyor.

Still a further object is to provide candling means, and drying means as a part of the machine.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a side elevation of an egg washing machine illustrating an embodiment of my invention;

Figure 2 is a top or plan view of the machine, parts being broken away;

Figure 3 is an enlarged vertical sectional view on the line 3—3 of Figure 2;

Figure 4 is an enlarged transverse vertical sectional view on the line 4—4 of Figure 1; and Figure 5 is a similar view on the line 5—5 of Figure 1.

At opposite ends of a suitable framework 10 are pairs of transversely spaced sprocket wheels 11 and 11a, on shafts 12 and 13, respectively. Rotation is imparted to the shaft 13 from a motor 14 by sprockets 15—16 and a chain 17, or other suitable means.

A conveyor C has laterally spaced chains 18 which travel over the sprocket 11 and 11a, and are connected by meshed screen 20.

Under the wire mesh 20 at the top, and extending around the right end of the conveyor is a smooth platform member 22, preferably of sheet metal which is curved at 22b at its right end. A similar member 22a extends under the bottom conveyor stretch and is curved around the right end, as shown at 22c, parallel to portion 22b, as is clear in Figure 1.

At the left end of the upper stretch of the conveyor C (Fig. 1), the eggs 23 are placed in the compartments formed by the wire mesh, and on the members 22. As the upper stretch of the conveyor advances toward the right (Fig. 1), the eggs roll and slide on the smooth platform member 22.

At D is a candling means. The platform member 22 is formed with suitable slots 24, or their equivalents, and below the slots are suitably mounted lamps 26 and shades 27.

At E the member 22 under the upper stretch of the conveyor is depressed to form a water or fluid holding pan or basin 28. Above the basin 28 horizontal round brushes 30 are mounted to rotate on vertical axes.

The bristles of the brushes 30 project part way only into the water in the basin so that the bodies of the brushes will be as little subject to moisture as possible.

As the eggs travel under the rotating brushes 30, they are rolled and washed by the brush bristles. They then travel over the right hand end of the basin 28 and into another basin 32 to be rinsed.

Guide flanges 36 (Fig. 5) above the chains 18, function to guide the chains to cause the mesh 20 to travel into the basins.

At the right of the conveyor C as shown in Figs. 1 and 3, the eggs travel between the member 22a and the member 22. In the lower stretch of conveyor, the member 22a has a set of slots, or the like, 40 (Fig. 5). Above them and above the lower stretch of the conveyor, is a blower 42 to subject the eggs to a draft of air for drying them.

At the left end of the conveyor C, as viewed in Figure 1, short laterally spaced guide fingers or the like 44 (Figs. 1 and 4) project from the platform member 22a and the eggs are guided over them and are received by a conveyor F.

Summarizing the operation, the eggs are placed on the conveyor C at one end thereof, so that each egg is in a compartment formed by the wires of the mesh 20, and rests on the smooth platform 22. The traveling mesh 20 slides or rolls the eggs on the platform 22. At D the eggs can be candled and any undesirables removed. The eggs are then moved into the basin 28 which contains water or other cleansing fluid. There they are brushed by the bristles of the rotating brushes 30 and thoroughly cleaned. From thence they go to the rinsing basin 32, then around the right end of the conveyor to the lower stretch thereof. As they travel they are subjected to a draft of drying air by means of the blower 42. Finally they are delivered to the conveyor F, which carries the eggs to a breaking place (not shown), or to a packing place.

It is my purpose to cover by my claims any use of equivalent features of structure and any modifications of the illustrative mechanism shown, which may fairly come within their scope and the scope of my invention.

I claim as my invention:

1. In an egg handling machine, a conveyor having a mesh member to receive and advance eggs, said conveyor having vertically spaced stretches, a platform below the upper stretch, on which eggs may rest and roll, said platform having adjacent one end slots for the passage of light arranged so that the eggs advanced by the mesh member will travel above the slots to permit the eggs to be candled, said platform having a washing basin and a rinsing basin, the conveyor being adapted to successively advance the eggs through said basins, said platform having at one end of the conveyor a curved portion extending substantially to the lower stretch of the conveyor, a platform under the lower stretch of the conveyor on which eggs advanced by the mesh member may rest and roll, said second platform having a curved portion extending substantially to the upper stretch of the conveyor parallel with the curved portion of the first platform, and a blower between the stretches for directing a draft of air on the eggs carried along the lower stretch, said second platform having slots below the blower to allow air passage, but too narrow to interfere with the travel of the eggs.

2. In an egg handling machine, a conveyer having a mesh-like member for receiving and advancing eggs, said conveyer having vertically spaced stretches, a platform below the upper stretch on which the eggs may rest and roll, said platform having adjacent one end slots for the passage of light arranged so that the eggs advanced by the mesh member will travel above the slots to permit the eggs to be candled, said platform having a washing basin and a rinsing basin, the conveyer being positioned to successively advance the eggs through said basins, a platform under the lower stretch of the conveyor on which the eggs advanced by the mesh-like member may rest and roll, and a blower between the stretches for directing a draft of air for drying the eggs carried along the lower stretch.

OSCAR W. SWANSON.

REFERENCES CITED

The following references are of record in the file of this patent:

UNITED STATES PATENTS

| Number | Name | Date |
|---|---|---|
| 1,283,949 | Stevenson | Nov. 5, 1918 |
| 1,423,059 | Williamson | July 18, 1922 |
| 1,520,424 | McCullough | Dec. 23, 1924 |
| 1,530,415 | Roussel | Mar. 17, 1925 |
| 1,671,038 | McKam | May 22, 1928 |
| 1,776,784 | Cramer | Sept. 30, 1930 |
| 1,787,063 | Cano | Dec. 30, 1930 |
| 1,901,494 | Hawk | Mar. 14, 1933 |
| 1,914,852 | Goodell et al. | June 20, 1933 |
| 2,011,328 | Tuttle | Aug. 13, 1935 |
| 2,080,198 | Brandenburg | May 11, 1937 |
| 2,153,296 | Brogden | Apr. 4, 1939 |
| 2,247,175 | Ostrom | June 24, 1941 |
| 2,964,275 | Secondo | June 26, 1943 |